(12) United States Patent
Kobyakov et al.

(10) Patent No.: US 8,218,226 B2
(45) Date of Patent: Jul. 10, 2012

(54) SURFACE-PLASMON-BASED OPTICAL MODULATOR

(75) Inventors: Andrey Kobyakov, Painted Post, NY (US); Kevin Bryan Sparks, Hickory, NC (US); Aramais Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 12/510,499

(22) Filed: Jul. 28, 2009

(65) Prior Publication Data

US 2010/0039693 A1 Feb. 18, 2010

Related U.S. Application Data

(60) Provisional application No. 61/189,100, filed on Aug. 15, 2008.

(51) Int. Cl.
*G02F 1/01* (2006.01)
*G02F 1/03* (2006.01)
*G02F 1/29* (2006.01)
(52) U.S. Cl. .................. 359/276; 359/245; 359/315
(58) Field of Classification Search .............. 359/245, 359/276, 315, 566, 569, 572, 573; 372/26, 372/102; 250/548; 385/2, 8, 10, 16, 37
See application file for complete search history.

(56) References Cited

U.S. PATENT DOCUMENTS

| 5,067,788 A | 11/1991 | Jannson et al. ............... 385/2 |
|---|---|---|
| 5,625,729 A | 4/1997 | Brown ............................ 385/31 |
| 5,729,641 A | 3/1998 | Chandonnet et al. .......... 385/2 |
| 5,852,488 A | 12/1998 | Takemura ..................... 349/187 |
| 5,986,808 A | 11/1999 | Wang .............................. 359/585 |
| 6,034,809 A | 3/2000 | Anemogiannis ............. 359/254 |
| 6,040,936 A * | 3/2000 | Kim et al. ..................... 359/245 |
| 6,982,819 B2 * | 1/2006 | Sawin et al. ................. 359/245 |
| 2004/0190116 A1 | 9/2004 | Lezec et al. .................. 359/298 |

FOREIGN PATENT DOCUMENTS

| EP | 0992833 | 4/2000 |
|---|---|---|
| EP | 1098210 | 5/2001 |
| WO | WO99/49353 | 9/1999 |

(Continued)

OTHER PUBLICATIONS

Liu, S. W., et al., "Electro-optic switch in ferroelectric thin films mediated by surface plasmons", Applied Physics Letters, American Institute of Physics, vol. 88, No. 14, Apr. 6, 2006, pp. 143512-143512-3.

(Continued)

*Primary Examiner* — Ricky Mack
*Assistant Examiner* — Mahidere Sahle
(74) *Attorney, Agent, or Firm* — Matthew J. Mason

(57) ABSTRACT

An optical modulator that utilizes Bloch surface plasmon (BSP) effects is disclosed. The BSP optical (BSPO) modulator (10) includes a permittivity-modulated (P-M) grating (20) that can be one-dimensional or two-dimensional. Electro-optic (EO) substrates (30) sandwich the P-M grating. The EO substrates have electrodes (64) arranged thereon, and a voltage source (60) connected to the electrodes is used to provide an applied voltage ($V_{30}$) via a modulation voltage signals (SM) that switches the modulator. Index-matching layers (40) may be used to mitigate adverse reflection effects. The BSPO modulator allows for normally incident input light (100I) to be modulated directly without having to generate oblique angles of incidence for the input light in order to excite the surface plasmon.

9 Claims, 10 Drawing Sheets

FOREIGN PATENT DOCUMENTS

WO    WO99/60731       11/1999
WO    WO2006/013867    2/2006

OTHER PUBLICATIONS

Gerard, D., et al., "Analysis of the Bloch mode spectra of surface polaritonic crystals in the weak and strong coupling regimes: grating-enhanced transmission at oblique incidence and suppression of SPP radiative losses", Optics Express, vol. 12, No. 16, Aug. 9, 2004, pp. 3652-3663.

Boyd, Robert W., "The Electrooptic and Photorefractive Effects", Nonlinear Optics, Second Edition, Academic Press, 2003, p. 490.

Mahapatra, Amaresh, et al., "Electrooptic Modulators", in Optical Fiber Telecommunications IVA, I. P. Kaminow and T. Li, eds., pp. 258-294, Academic Press, 2002.

Chang, William S. C., "Multiple quantum well electroabsorption modulators for RF photonic links", in RF Photonic Technology in Optical Fiber Links, W. S. C. Chang, ed., pp. 165-202, Cambridge University Press, 2002.

Heismann, Fred, et al., "Lithium Niobate Integrated Optics: Selected Contemporary Devices and System Applications", in Optical Fiber Telecommunications IIIB, I. P. Kaminow and T. L. Koch, eds., pp. 377-462, Academic Press 1997.

Zayats, Anatoly V., et al., "Nano-optics of surface plasmon polaritons", Physics Reports 408 (2005), pp. 131-314.

Kobyakov, Andrey, et al., "Fundamental and higher-order Bloch surface plasmons in planar bimetallic gratings on silicon and glass substrates," Journal of the Optical Society of America (JOSA) B, vol. 25, No. 9 (Sep. 2008), pp. 1414-1421.

Kobyakov, Andrey, et al., "Semi-analytical method for light interaction with 1D-periodic nanoplasmonic structures," Optics Express, vol. 16, No. 12, Jun. 9, 2008 (pp. 8938-8957).

* cited by examiner ns**
SURFACE-PLASMON-BASED OPTICAL MODULATOR

CROSS-REFERENCE TO RELATED APPLICATIONS

This application claims the benefit of, and priority to U.S. Provisional Patent Application No. 61/189,100 filed on Aug. 15, 2008 entitled, "Surface-Plasmon-Based Optical Modulator", the content of which is relied upon and incorporated herein by reference in its entirety.

FIELD OF THE INVENTION

The present invention relates generally to optical modulators, and in particular to optical modulators based on surface plasmon effects.

TECHNICAL BACKGROUND

Optical modulators are used in a variety of optical systems to alter the intensity of a light beam, usually in a rapid manner that imparts information onto a carrier optical signal. In optical systems based on waveguides, such as optical telecommunication systems that employ optical fibers, optical modulators are used to encode information onto light guided by the waveguides. Other applications for optical modulators include their use as fast switches to perform logic operations, and to act as light gates that selectively block or transmit light without necessarily imparting information onto the light beam.

State-of-the-art optical modulators are typically either electro-optic-(EO)-based or electroabsorption-(EA)-based. The former are based on the linear electro-optic (Pockels) effect, while the latter exploit either the Franz-Keldysh effect or the quantum confined Stark effect in multiple quantum well heterostructures. EO-based modulators typically employ a Mach-Zehnder interferometer (MZI) fabricated in an EO material (usually, lithium niobate) using standard methods of fabricating integrated optical devices and systems (e.g., Ti-indiffusion, proton exchange, etc.). Unfortunately, since the MZI is external to the optical fiber, coupling between the MZI and the waveguide causes undesired optical signal attenuation. Also, the attenuation process involves dividing up a light beam into two light beams, imparting relative phases to the light beams, and then interfering the light beams. This makes for a rather complicated system and process.

EA-based modulators, on the contrary, can be integrated with a laser on a single chip. However, they typically have a relatively low extinction ratio (i.e., the ratio of power levels corresponding to logical "1" and "0") of ~10 dB. Currently used EAMs are bulky and their integration with systems and/or devices that have different materials is not straightforward.

Certain fiber optic modulators seek to rely on the use of surface plasmons. A surface plasmon (SP) is an electromagnetic wave that travels at the interface between a metal layer and a dielectric layer (which can be air) when certain conditions are met. SP-based optical modulators utilize a structure that selectively converts the power carried by a guided light wave into the SP. By selectively varying the amount of power converted to the SP, the guided light wave is selectively attenuated to achieve the required analog or digital modulation.

To date, SP-based fiber optic modulators rely on lateral (i.e. parallel to the fiber axis) light coupling to the particular metal-dielectric structure in order to achieve the necessary conditions for exciting the SP. For example, light intensity modulation is achieved in one instance by evanescent coupling of the propagating mode of the waveguide and the plasmon mode supported by a metal-dielectric interface external to the waveguide. Other approaches use prisms or grating to obtain an oblique incident angle to excite the SP.

SUMMARY OF THE INVENTION

A first aspect of the invention is an optical modulator having a central axis and that employs a Bloch surface plasmon (BSP) effect at an operating wavelength to modulate input light when subject to an applied voltage. The optical modulator includes a permittivity-modulated (P-M) grating having a surface, and a central axis perpendicular to the surface and substantially aligned with the optical axis. The P-M grating includes a periodic arrangement of metal sections and/or metal and dielectric sections that define the grating surface and that define a modulated permittivity. The optical modulator also includes first and second EO substrates having respective refractive indices that can vary in response to the applied voltage. The first and second EO substrates are arranged along the optical axis so as to sandwich the P-M grating and form a configuration that supports the BSP when at least one of the EO substrates is subject to the applied voltage via electrodes operably arranged on at least one of the EO substrates.

A second aspect of the invention is an optical modulator having a central axis and that employs a BSP effect at an operating wavelength to modulate input light when subject to an applied voltage. The optical modulator includes an EO substrate having first and second substantially parallel surfaces and having a refractive index that can vary in response to the applied voltage. The optical modulator also includes first and second P-M gratings arranged so as to sandwich the EO substrate to form first and second substrate-grating interfaces that support respective first and second BSPs when the EO substrate is subject to the applied voltage via electrodes operably arranged on the EO substrate. The optical modulator also includes first and second dielectric substrates respectively arranged immediately adjacent the first and second P-M gratings and opposite the EO substrate.

A third aspect of the invention is a method of modulating input light using a BSP effect to form modulated output light. The method includes providing at least one P-M grating that defines an operating wavelength. The method also includes interfacing the at least one P-M grating with at least one EO substrate having an index of refraction that can change when subject to an applied voltage so as to form at least one grating-substrate interface that can support at least one BSP. The method further includes passing input light through the at least one grating-substrate interface while varying the applied voltage to the at least one EO substrate so as to alter the ability of at least one grating-substrate interface to support the at least one BSP at the operating wavelength so as to selectively attenuate the input light to form the modulated output light.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

Figure 1:
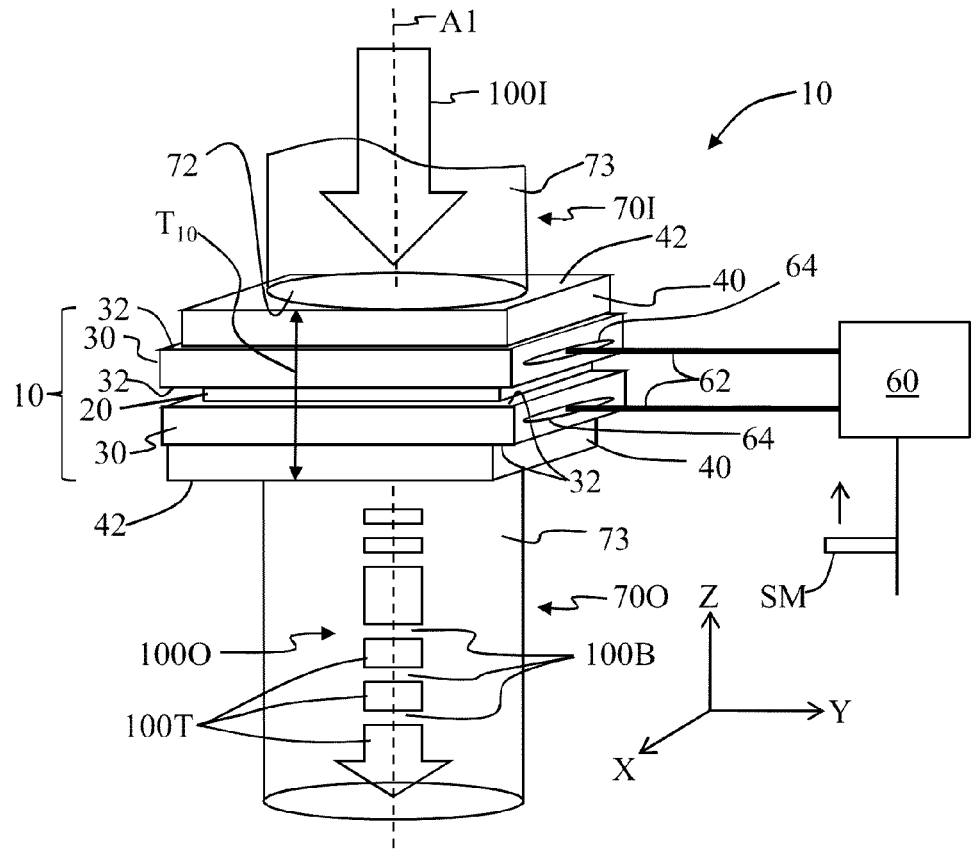
FIG. 1 is a perspective schematic diagram of a first example embodiment of Bloch-surface-plasmon-based optical modulator ("BSPO modulator") that uses a 1D P-M grating.

Additional features and advantages of the invention are set forth in the detailed description that follows and will be apparent to those skilled in the art from the description or recognized by practicing the invention as described in the following description together with the claims and appended drawings.

DETAILED DESCRIPTION

Reference is now made in detail to the present preferred embodiments of the invention, examples of which are illustrated in the accompanying drawings, which are not necessarily to scale. Whenever possible, like or similar reference numerals are used throughout the drawings to refer to like or similar parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

The present invention takes advantage of the effects of the excitation of BSPs as described in the article by A. Kobyakov et al., entitled "Fundamental and higher-order Bloch surface plasmons in planar bimetallic gratings on silicon and glass substrates," published in the Journal of the Optical Society of America (JOSA) B, vol. 25 (2008) (in press) and available at http://josab.osa.org/upcoming.cfm, and in the article by A. Kobyakov et al., entitled "Semi-analytical method for light interaction with 1D nano-plasmonic structures," Optics Express, Vol. 16, No. 12, 9 Jun. 2008 (pp 8938-57), which articles are both incorporated by reference herein.

DEFINITIONS

Terms such as "horizontal," "vertical," "front," "back," "input," "output," "inner," "outer," etc., and the use of Cartesian Coordinates are for the sake of reference in the drawings and for ease of description and are not intended to be strictly limiting either in the description or in the claims as to an absolute orientation and/or direction. The term "waveguide" means "optical waveguide" and is not limited to optical fibers, though the invention is particularly well-suited for optical waveguides in the form of optical fibers. The symbol "~" is used below as shorthand to mean "approximately."

BSPO Modulator with One 1D P-M Grating

FIG. 1 is a perspective schematic diagram of an example embodiment of a Bloch-surface-plasmon-based optical modulator ("BSPO modulator") 10 having a central optical axis A1, an input side 12I and an output side 12O. Cartesian coordinates are shown for the sake of reference. BSPO modulator 10 is shown interfaced with waveguides 70 having ends 72 and a core region ("core") 73. For the sake of description, waveguides 70 are identified as and referred to in certain instances as input and output waveguides 70I and 70O that respectively carry input light 100I and (modulated) output light 100O as described in detail below. In FIG. 1, a cladding region ("cladding") 74 that surrounds the core 73 is omitted for ease of illustration, as is a buffer layer 75 that surrounds the cladding (see FIG. 3).

BSPO modulator 10 includes a permittivity-modulated periodic plane grating 20 ("P-M grating") having upper and lower surfaces 22 and 24. P-M grating 20 is sandwiched along optical axis A1 by two electro-optic (EO) substrates 30 each having substantially parallel surfaces 32. In an example embodiment, surfaces 32 may be corrugated, but the surfaces are still generally substantially planar and parallel to each other because the size of the corrugation is much less than the dimensions of EO substrates 30. EO substrates 30 are arranged in BSPO modulator 10 to be substantially perpendicular to optical axis A1. EO substrates 30 are discussed in greater detail below.

Figure 2:
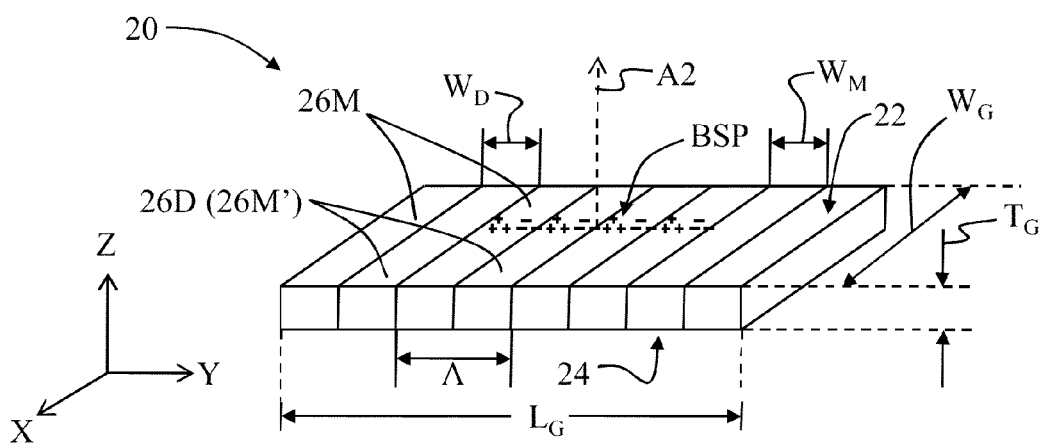
FIG. 2 is a close-up perspective view of an example embodiment of a one-dimensional P-M grating for use in the BSPO modulator of FIG. 1.

With reference to FIG. 2, in an example embodiment, P-M grating 20 is in the form of a metal-dielectric grating that includes a periodic arrangement of metal sections (strips) 26M and dielectric sections (strips) 26D of respective widths $W_M$ and $W_D$, shown as oriented in the X-direction and periodically varying in the Y-direction. This configuration is referred to as a "one dimensional" or 1D grating. P-M grating 20 has a thickness $T_G$, a length $L_G$, and a width $W_G$. In an example embodiment, $L_G = W_G$. P-M grating 20 has a surface 22 and a central axis A2 perpendicular to surface 22.

In an example embodiment, grating thickness $T_G$ is in the range from 50 nm to 250 nm. Also in an example embodiment, $L_G = W_G \sim 10$ μm and $T_G \sim 100$ nm. Thus, BSPO modulator 10 can have a cross-sectional size (e.g., diameter) on the order of a typical waveguide core 73, e.g., ~10 μm×10 μm. These dimensions allow BSPO modulator 10 to have a small form factor that offers advantages for coupling to, and packaging with, optical waveguides, and in particular optical fibers. Larger P-M gratings 20 can be formed and used to create larger BSPO modulators 10 for use with larger fiber cores, such as optical fibers 70I and 70O having a large effective area (i.e., so-called "large effective area fibers").

At an operating wavelength $\lambda_O$, metal strips 26M preferably have low loss and have a finite negative permittivity $\in$ so as to be suitable for excitation of BSPs. Examples of metals most suitable for forming metal strips 26M include gold, silver, and copper because of their low loss. The refractive index $n_D$ of the dielectric strips 26D can vary widely. For example, dielectric strips 26D can be formed from the same EO material used to fabricate the EO substrates 30, while in another example the dielectric strips can be air.

In another example embodiment, $n_D$ is made negative through the use of a bimetallic P-M grating 20, wherein dielectric strips 26D of grating 20 are replaced with metal strips 26M' having a different permittivity ($\in_2$) than metal strips 26M ($\in_1$). The necessary permittivity modulation is achieved, for example, by alternating strips of two metals 26M and 26M' that are optically different in some wavelength range, such as gold and silver at a visible wavelength. Example metals for strips 26M and 26M' include, for example, gold and silver. Other option for creating a bimetallic P-M grating 20 include geometric structuring to modify the effective permittivity of the metal strips and using alloys or metal-dielectric composites having a prescribed effective permittivity. Periodic modulation of the permittivity can also be achieved by corrugating one or both metal section surfaces.

P-M grating 20 has a period Λ that defines (selects) the desired operating wavelength $\alpha_O$ of BSPO modulator 10. In an example embodiment, the operating wavelength $\alpha_O$ is selected to be at or near the center of the telecom C-band wavelength of 1550 nm. In other example embodiments, the operating wavelength $\lambda_O$ is selected to be at or near 1300 nm, or at or near 850 nm. It is expected that BSPO modulator 10 would operate more efficiently at these latter wavelengths because of lower losses in metals at higher optical frequencies.

In an example embodiment, the grating thickness $T_G$ is about 100 nm, while the EO substrate thickness $T_{30}$ (FIG. 3) for each EO substrate is greater than about 400 nm in order to ensure proper localization of the BSP.

In an example embodiment, the duty cycle $D = W_D / \Lambda < \frac{1}{2}$. In an example embodiment as determined by computer simulations by the inventors, D is preferably about 0.2. However, one skilled in the art will appreciate that further optimization of the duty cycle D can be performed based on the particular application and related design parameters for BSPO modulator 10.

In a preferred example embodiment, P-M grating 20 is formed directly on one of the EO substrate surfaces 32 using conventional deposition techniques. For example, the particular EO substrate surface 32 is first coated with a metal layer. Photoresist is then deposited over the layer and patterned (e.g., using photolithographic exposure) to define the location of the dielectric regions. The exposed photoresist is then developed and the structure etched to remove the exposed metal. Either air or another dielectric material (e.g., silica) can be selectively deposited in between metal strips 26M to form dielectric strips 26D. The remaining photoresist covering the metal strips 26M is then removed. Note that corrugated metal sections 26M and/or 26M' can be formed by corrugating EO substrate surface 32 and then forming a metal film (or films) on the corrugated surface.

With reference again to FIG. 1, EO substrates 30 are made of an EO material. Example EO for EO substrates 30 include lithium niobate barium titanate, and strontium barium niobate. EO substrates 30 are preferably formed so that their crystal orientation provides the largest EO coefficient for the particular material used.

EO substrates 30 are electrically connected to a voltage source 60 via electrical lines 62. Electrodes 64 (see also FIG. 3 and FIG. 7) are formed on the substrates and serve to provide the needed electrical connection. In one example embodiment illustrated in FIG. 7A, transparent electrodes 64 are used to provide applied voltage $V_{30}$ across EO substrate 30 along the A1 axis. In this instance, the small thickness $T_{30}$ of EO material between electrodes 64 allows for smaller voltages (e.g., 5V to 10V) to be used, resulting in faster switching. Transparent electrodes 64 can be formed from any number of transparent conducting films, such as for example tin-doped indium oxide, fluorine-doped tin oxide, or doped zinc oxide. The transparent conducting films made from these metal oxides are usually formed on glass or ceramic substrates. Known methods of forming transparent conducting films include chemical vapor deposition (CVD) methods (e.g., plasma CVD methods and light CVD methods), physical vapor deposition (PVD) methods (e.g., vacuum evaporation methods, ion plating methods and sputtering methods), and various coating methods.

Figure 3:
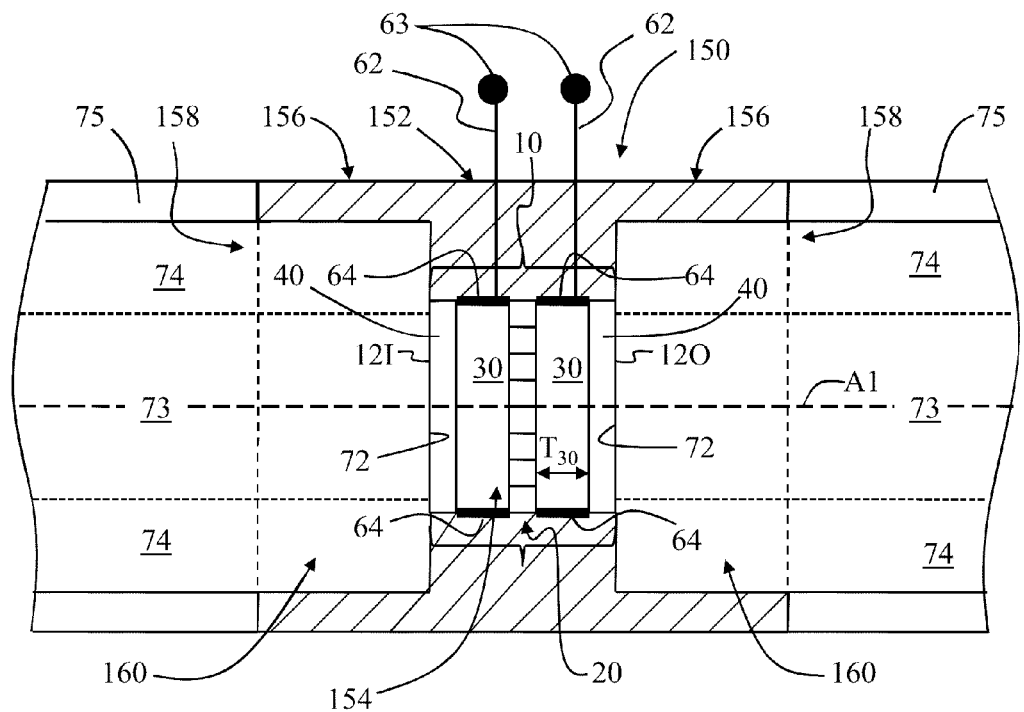
FIG. 3 is a schematic cut-away side view of an example embodiment wherein the BSPO modulator is maintained within a housing configured to facilitate interfacing or otherwise operably connecting waveguides to the BSPO modulator.

In other example embodiments such as shown in FIG. 1 and FIG. 3, electrodes 64 are provided at the sides of EO substrates 30 so that the voltage potential $V_{30}$ is across optical axis A1. In this case, higher voltages (e.g., 50V to 70V, and generally <100V) are required, which slows the switching speed somewhat. To optimize switching speed and efficiency, the applied voltage $V_{30}$ is applied to both EO substrates 30. The necessary applied voltage $V_{30}$ can be reduced if materials with larger EO coefficients than lithium niobate (r33=31 pm/V) are used, such as barium titanate $BaTiO_3$ (r33=97 pm/V, r42=1640 pm/V), or strontium barium niobate (r33=224 pm/V). A further reduction in applied voltage $V_{30}$ can be achieved through additional optimization of P-M grating 20.

In an example embodiment, one or two index-matching layers 40 are provided adjacent one or both EO substrate surfaces 32 on the side opposite. Index-matching layers 40 each have a surface 42 opposite the adjacent EO substrate 30 (i.e., at BSPO modulator input end 12I and output end 12O, respectively). Index-matching layers 40 are configured to reduce reflections when BSPO modulator 10 is interfaced with one or more waveguides 70, such as shown in FIG. 1. In an example embodiment, one or both index-matching layers 40 include one or more thin dielectric plates (not shown) configured to prevent reflection of light from the structure due to unequal refractive indices of the material (e.g., silica, doped silica, etc.) of waveguides 70 and the EO material in EO substrates 30. In an example embodiment, one or both of index-matching layers 40 comprise one or more thin-film anti-reflection coatings (not shown) applied to one or both outer surfaces 32 of EO substrates 30.

In an example embodiment, one or both waveguides 70 are optical fibers. In a preferred embodiment, waveguides 70 are polarization-maintaining to ensure that the electromagnetic (EM) wave incident upon P-M grating 20 is a TM EM wave. Waveguides 70 can also be non-polarization-maintaining, but then P-M grating 20 preferably is 2D symmetric (i.e., a tessellated arrangement of metal squares or rectangles separated by dielectric sections), as discussed in greater detail below.

In an example embodiment, BSPO modulator 10 is most easily fabricated using standard photolithographic processes and techniques, which are often used to make micron-sized and nanometer-sized structures and devices for a variety of photonics, integrated optics and semiconductor applications. Similarly, the proposed modulator can be integrated with optical waveguides 70 in photonic integrated circuits as well as with optical fiber waveguides. The construction of BSPO modulator 10 is not bound to a specific material or group of materials such as lithium niobate or gallium arsenide. One skilled in the art will appreciate that judicious design of P-M grating 20 can make BSPO modulator 10 compatible with a wide variety of materials platforms.

In an example embodiment, the overall thickness $T_{10}$ of BSPO modulator 10 can be made to fall in the range from about 1 μm to 2 μm without using index-matching layers 40, and in the range from about 5 μm to 7 μm using index-matching layers.

BSPO modulator 10 is preferably configured so that it transmits light at the operating wavelength $\lambda_O$ with very low attenuation (e.g., ~2 dB or less) when in the "transmit" or "OFF" mode, and to have very high attenuation (e.g., ~20 dB or greater) in the "block" or "ON" mode. BSPO modulator 10 can be configured so that either the "ON" mode requires an applied voltage or the "OFF" mode requires an applied voltage. In the discussion below, the "OFF" mode is selected as the "no applied voltage" mode for the sake of illustration.

The wide range of attenuations (and thus the large extinction ratio) is made possible at normal incidence by the selective excitation of the BSP mode, whose eigenfrequency coincides with the operating wavelength $\lambda_O$ of input light 100I. This is in contrast to other SP-based optical modulators that require an oblique angle of incidence. Note that the BSP is a collective excitation that forms a standing wave rather than an SP wave that travels in a given direction. This standing-wave BSP is schematically represented in FIG. 2 by an electric charge distribution (+, −) on P-M grating surface 22.

When using BSPO modulator 10 as part of a guided-wave optical system, a first step typically will involve interfacing the modulator with one or more waveguides 70. In one example embodiment, waveguides 70 in the form of optical fibers are interfaced with BSPO modulator 10 at input and output sides 12I and 12O.

FIG. 3 is a schematic cut-away side view of an example embodiment wherein BSPO modulator 10 is maintained within a housing 150 configured to facilitate interfacing or otherwise operably connecting waveguides 70 to the modulator. Housing 150 includes a central section 152 having an interior 154 configured to contain BSPO modulator 10. Housing 150 also includes channel sections 156 on opposite sides of housing 150 that have open ends 158 and that define respective channels 160 sized to accommodate respective waveguides 70. In an example embodiment, channels 160 have the same size to accommodate two identical waveguides 70, while in another example embodiment, channels 160 are sized (and/or shaped) to accommodate different waveguides 70. In an example embodiment, electrical lines 62 connected to electrodes 64 include electrical contacts 63 to facilitate connection with voltage source 60.

Figure 4:
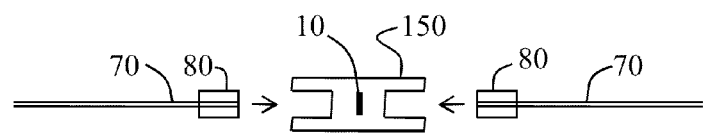
FIG. 4 is a schematic diagram illustrating the housing of FIG. 3, and showing connectorized optical fibers being connected to housing connector ends.

Housing 150 is particularly useful for coupling two optical fibers 70 to one another. FIG. 3 illustrates an example embodiment wherein buffer layer 75 is partially stripped off so that the "bare" fiber 70 (i.e., core 73 with cladding 74) can be inserted into channels 160. In another example embodiment, channel sections 156 can be formed to accommodate standard optical fiber connectors (e.g., an STP-type connector), and the end portions of fibers 70 can be connectorized with standard optical fiber connectors 80, such as shown in FIG. 4.

With reference again to FIG. 1, in the operation of BSPO modulator 10, input light 100I travels along optical axis A1 in input waveguide 70I and is incident upon BSPO modulator 10 at input side 12I. If an index-matching layer 40 is used to mitigate detrimental reflections due to the interface created at waveguide end 72, then input light 100I is first incident this index matching layer and experiences only minimal reflections. It should be mentioned here that BSPO modulator 10 can still function without one or both of the index-matching layers 40. However, one skilled in the art will appreciate that in most instances, it will be beneficial to reduce reflections to maximize the amount of light transmitted by the modulator in its transmit ("OFF") state.

Most of input light 100I thus travels to the first EO substrate 30. Assuming that the applied voltage $V_{30}=0$, the refractive index of the EO substrate n will have a relatively low value (e.g., n=2.1) so that the input light 100I is not substantially attenuated by the BSP effect provided at the grating-EO substrate interface. Input light 100I is thus substantially transmitted through P-M grating 20, the second EO substrate 30, and the second index-matching layer 40 without substantial attenuation when $V_{30}=0$, thereby forming output light 100O.

On the other hand, applying voltage $V_{30}$ to one or both EO substrates 30 via voltage source 60 serves to change the refractive index of substrates 30 and, consequently, to shift the eigenfrequency of the BSP. In the OFF state, the parameters of the system are such that a BSP is excited and mediates the high transmittance of the film. The applied voltage serves to substantially suppress the intensity of input (incident) light 100I, thereby forming a gap 100G in output light 100O where substantially no light is transmitted. Selectively turning on and off the applied voltage $V_{30}$ (or alternatively, selectively varying the applied voltage in the case of analog modulation) controls the occurrence and size of gaps 100G between portions of transmitted light 100T, thereby modulating output light 100O. In an example embodiment, a modulation signal SM provides the applied voltage $V_{30}$ to BSPO modulator 10 (and in particular to EO substrates 30 via electrodes 64) in a manner that includes modulation information and, if necessary, a bias voltage.

Note also that BSPO modulator 10 can be used as a digital EO switch for a number of applications, such as logical operation, laser mode-locking operations, etc. It is also noted here that applied voltage $V_{30}$ can be applied to either one or both EO substrates 30. Applying applied voltage $V_{30}$ to a single EO substrate 30 will not result in as good modulation performance, but may be acceptable for certain applications where a large attenuation (i.e., a high extinction ratio) is not required.

Figure 5A:
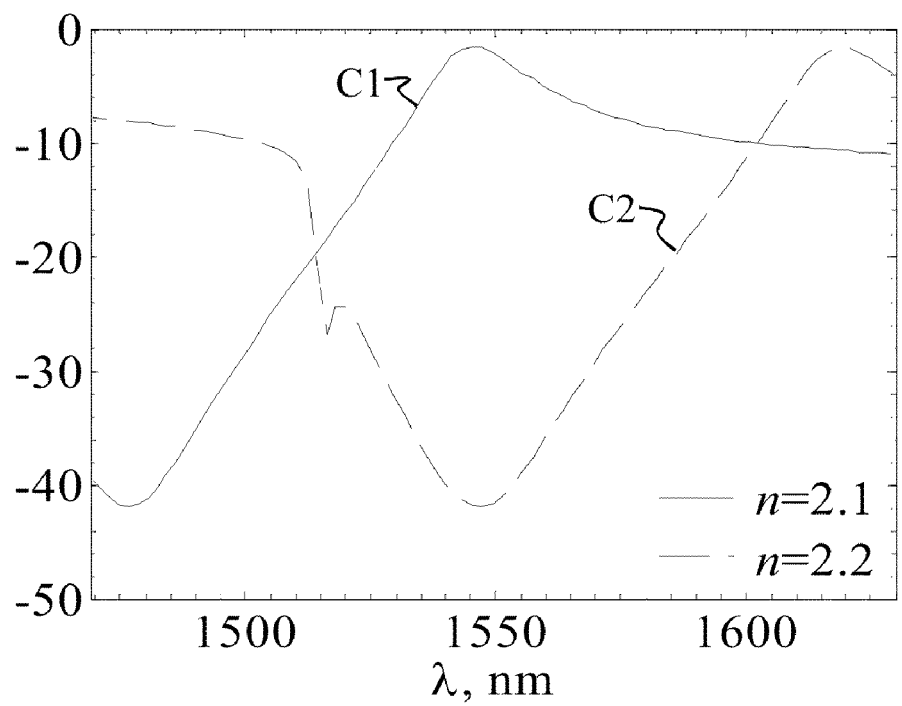
FIG. 5A is a "switching curve" plot of the transmission T (dB) of an input light as a function of wavelength λ (nm) for the BSPO modulator of FIG. 1 for two different values of applied voltage ($V_{30}$) that create two different refractive indices n=2.1 and 2.2.

FIG. 5A is a "switching curve" plot of the transmission T (dB) of input light 100I as a function of wavelength λ (nm) for an example BSPO modulator 10 for two different values of applied voltage $V_{30}$ that create two different refractive indices n=2.1 and 2.2. The two switching curves are denoted C1 and C2. FIG. 5A was created using a full numerical finite-difference time-domain (FDTD) simulation for the ideal case of a low-loss metal and a high applied voltage $V_{30}$. The simulated BSPO modulator 10 had a grating thickness $T_G$=116 nm, and grating period Λ=688 nm.

Curve C1 shows the transmittance T vs. wavelength λ when the voltage $V_{30}$ applied to the substrates is "OFF" ($V_{30}$=0) so that n=2.1. The difference in transmission values at a given wavelength represents the attenuation for that wavelength. Curve C2 shows the transmittance T vs. wavelength λ when the voltage $V_{30}$ applied to the substrates is "ON" ($V_{30}=V_{MAX}$), so that n=2.2. FIG. 5A shows that a rather large 40 dB extinction ratio is achievable at an operating wavelength $\lambda_O$ of about 1550 nm.

Figure 5B:
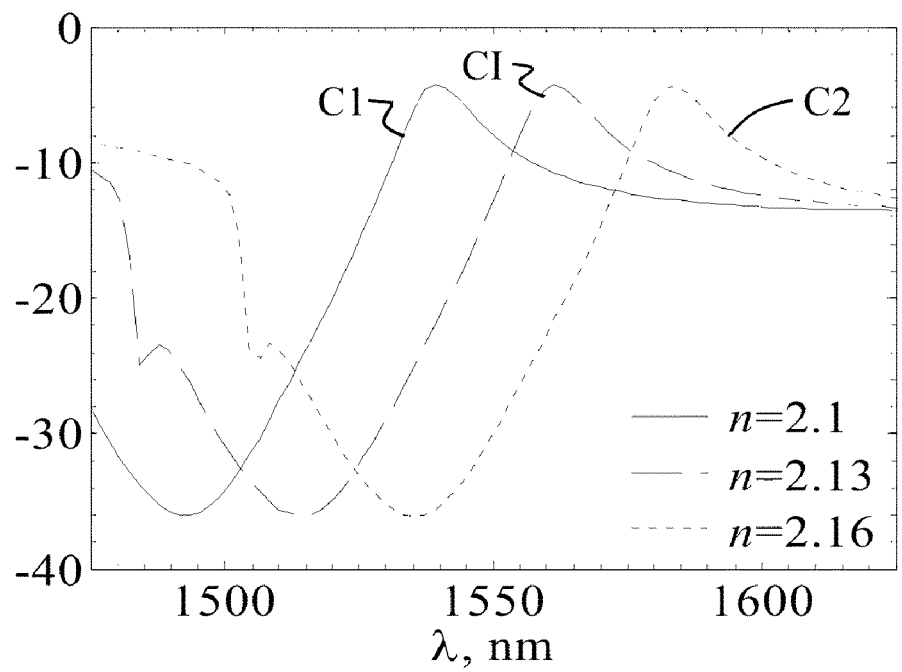
FIG. 5B is a switching-curve plot similar to FIG. 5A, but for a more realistic loss in the metallic strips and a smaller change in the refractive index n of the EO substrates (an intermediate switching curve CI is also shown)

FIG. 5B is a switching-curve plot similar to FIG. 5A, but for a more realistic loss in metallic strips 26M and a smaller change in the refractive index n of EO substrates 30. These changes lead to a higher loss in the transparent (transmit) state and smaller extinction ratio. The simulated BSPO modulator 10 had a grating thickness $T_G$=100 nm, and grating period Λ=694 nm. Three curves C1, CI through C2 are shown. Curve C1 shows $V_{30}$=0 (i.e., the "OFF" state) that results in a refractive index n=2.1. Curve CI is an "intermediate" curve where applied voltage $V_{30}$ is non-zero (i.e., in the "ON" state, but not at maximum voltage $V_{MAX}$) results in a refractive index n=2.13. Curve C3 is for $V_{30}=V_{MAX}$ (i.e., the full "ON" state), which results in a refractive index n=2.16. A smaller applied voltage $V_{30}$ was required to generate curves C1, CI and C2 of FIG. 5B as compared to FIG. 5A. Assuming that an acceptable extinction ratio is about 25 dB, then an acceptable operating wavelength bandwidth $\Delta\lambda_O$ (i.e., range for operating wavelength $\lambda_O$) is estimated from curves C1 and C2 to be about 20 nm.

Figure 6A:
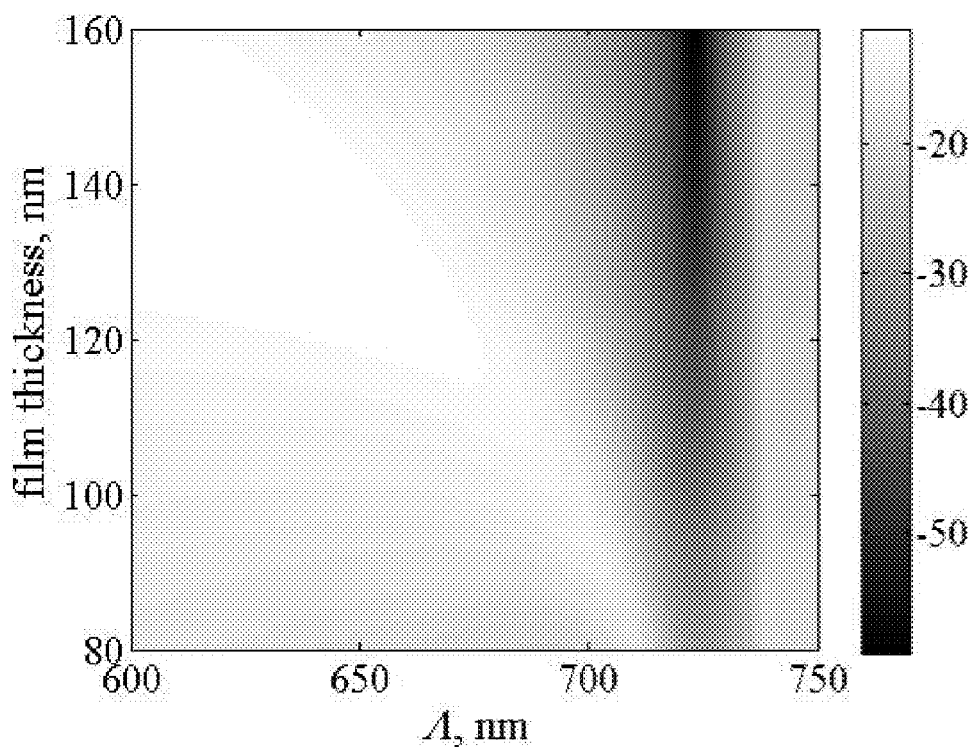
FIGS. 6A and 6B are gray-scale plots of the simulated transmittance T (dB) vs. grating thickness $T_G$ (Y-axis) and grating period Λ (X-axis) for the example BSPO modulator of FIG. 1, based on multi-parameter optimization calculations using the analytical model for the excitation of the BSP on thin-structured metal-dielectric films.
Figure 6B:
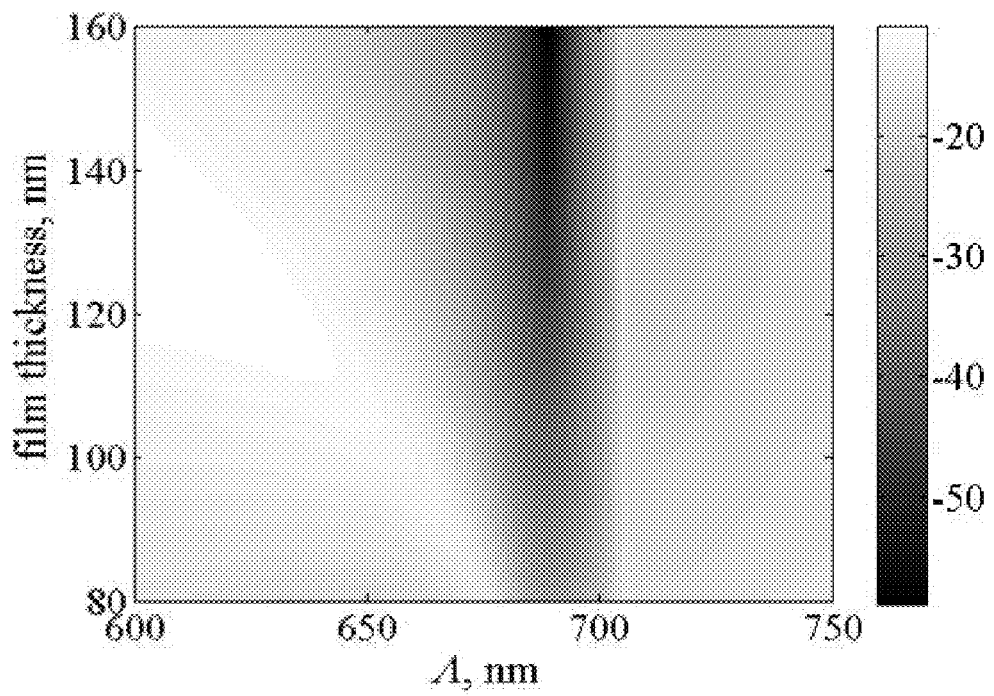

FIGS. 6A and 6B are gray-scale plots of the simulated transmittance T (dB) vs. grating thickness $T_G$ (Y-axis) and grating period Λ A (X-axis) for an example BSPO modulator 10 based on multi-parameter optimization calculations using the analytical model for the excitation of the BSP on thin-structured P-M films. Such calculations help to identify the parameter space for the most efficient operation of BSPO modulator 10. FIG. 6A is for n=2.1 (the "OFF" state) and FIG. 6B is for n=2.2 (the "ON" state).

Because the results in FIGS. 6A and 6B were obtained using simulations based on an analytical model, the value of the peak transmittance is slightly underestimated. Nevertheless, such an optimization based on modeling allows one to determine the appropriate grating thickness $T_G$ and the grating period Λ for P-M grating 20.

The switching speed of BSPO modulator 10 is generally governed by the particular EO substrate material used and so is generally the same as other EO-based modulators. For example, switching speeds of about 40 Gb/s are possible with lithium niobate EO substrates 30. These switching speeds may be diminished somewhat by the particular electrode configuration and the relatively high voltages (e.g., up to about 70V) needed to perform switching for non-axial electrode configurations.

BSPO Modulator with Two 1D P-M Gratings

Figure 7A:
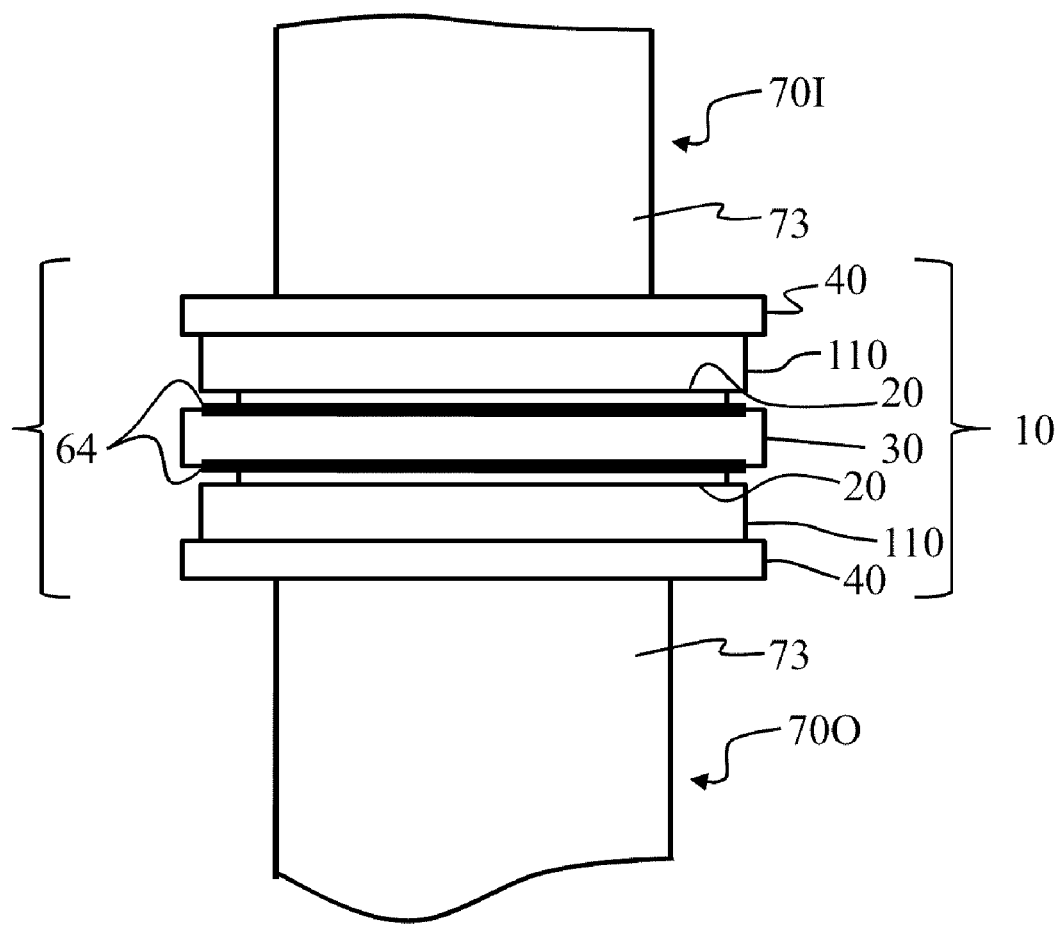
FIG. 7A is a schematic side view of another example embodiment of BSPO modulator similar to that of FIG. 1, but that uses two one-dimensional P-M gratings spaced apart by an EO substrate.
Figure 7B:
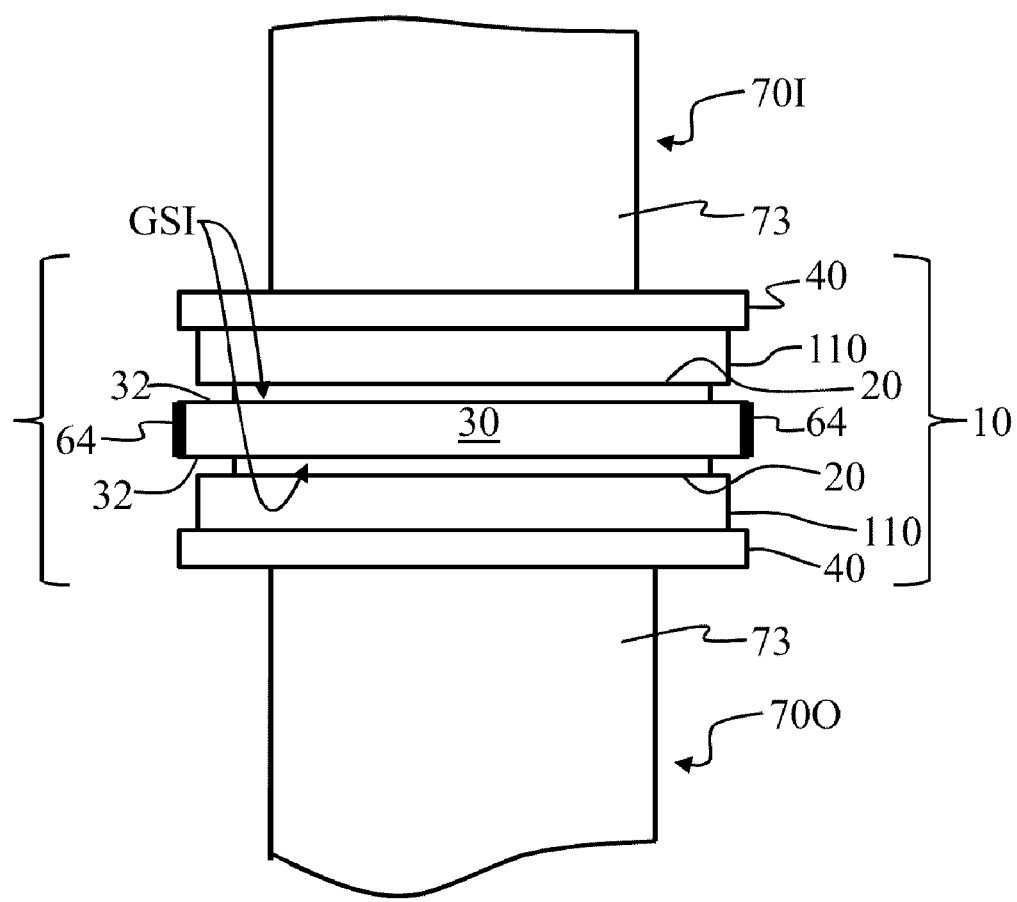
FIG. 7B is similar to FIG. 7A, but illustrates an example embodiment wherein non-transparent electrodes are arranged on the sides of the EO substrate.

FIG. 7A and FIG. 7B are schematic side views of example embodiments of BSPO modulator 10 similar to that shown in FIG. 1, but that uses two P-M gratings 20 spaced apart by an EO substrate 30, and with two dielectric substrates 110 that sandwich the two P-M gratings 20 along optical axis A1. EO substrate surfaces 32 and the two P-M gratings 20 form two corresponding grating-substrate interfaces GSI that each supports a BSP when BSPO modulator 10 is in the "ON" state.

As shown in FIG. 7A, two transparent conducting films on each EO substrate surface 32 can serve as transparent electrodes 64 for the single EO substrate 30 placed between them. This arrangement has the advantage of facilitating a homogeneous voltage distribution over the EO substrate surfaces 32. The thickness of transparent electrodes 64 is preferably kept as small as possible (e.g., on the order of 100 nm or so) to minimize coupling losses.

In another example embodiment, bimetallic P-M gratings 20 are used that themselves serve as electrodes. Also, where gratings 20 are P-M gratings, dielectric strips 26D can be made of conductive material and serve as transparent electrodes 64.

FIG. 7B shows an example embodiment wherein electrodes 64 are located on the sides of the EO substrate 30.

The single EO substrate embodiments of FIGS. 7A and 7B allow for a decreasing in the EO substrate thickness $T_{30}$ down to about 50 nm. In the embodiment of FIG. 7A that employs on-axis transparent electrodes 64, this allows for a substantial decrease in the amount of applied voltage $V_{30}$ required for switching, as compared to the first example embodiment described above. The decrease in the required applied voltage $V_{30}$ for the embodiment of FIG. 7B is significant as well, but not as great as for the on-axis electrodes embodiment of FIG. 7A. Each of the two P-M gratings 20 can now be twice as thin as the one considered in the first example embodiment discussed above, so that the transmittance of BSPO modulator 10 in the transmit ("OFF") mode is not affected.

Figure 8A:
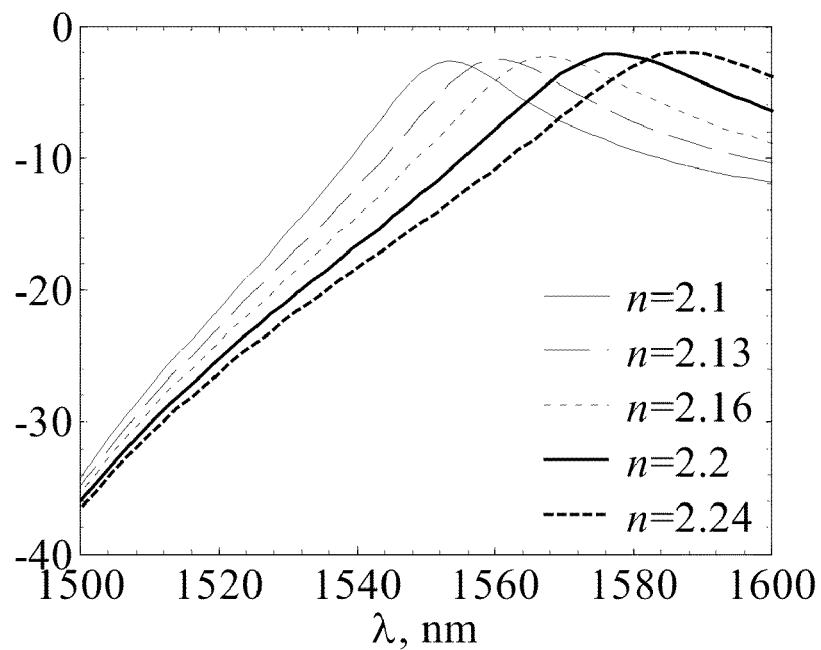
FIG. 8A shows simulated switching curves in a transmission T (dB) versus wavelength (λ) plot for an example embodiment of the two-grating BSPO modulator of FIGS. 7A and 7B for a number of different refractive indices n caused by different (simulated) applied voltages.

FIG. 8A shows simulated switching curves in a transmission T (dB) versus wavelength (λ) plot for an example embodiment of the BSPO modulator 10 shown in FIG. 7A for a number of different refractive indices n caused by different (simulated) applied voltages $V_{30}$. Other parameters for the simulation were: $T_G$=50 nm and Λ=696 nm for each P-M grating 20, and $n_{110}$=2.1 for both dielectric substrates 110. In FIG. 8A, the EO substrate thickness $T_{30}$=100 nm.

Figure 8B:
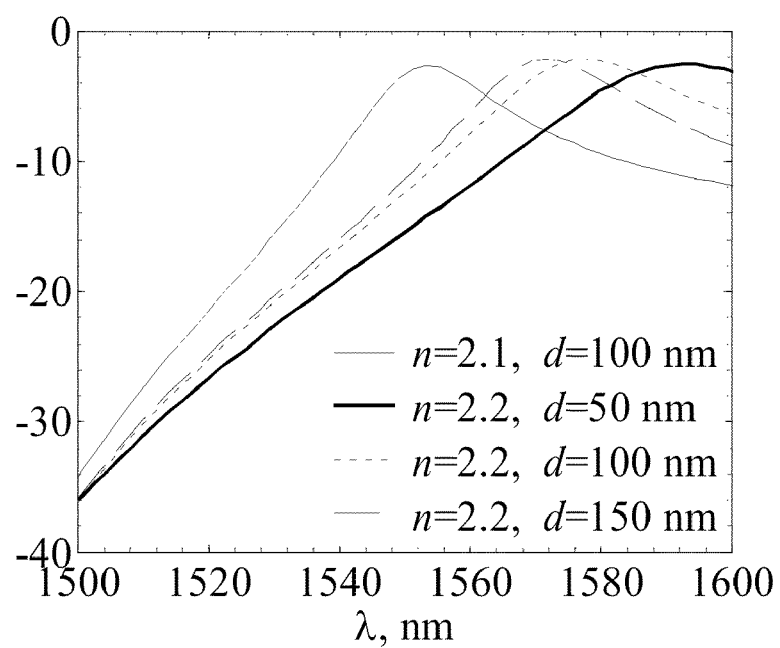
FIG. 8B is similar to FIG. 8A, except that different thicknesses $T_{30}$ of the EO substrate ($T_{30}$=50 nm, 100 nm and 150 nm) residing between the two gratings are included.

FIG. 8B is similar to FIG. 8A except that different thickness $T_{30}$ of EO substrates of $T_{30}$=50 nm, 100 nm and 150 nm are included. The switching curves of FIGS. 8A and 8B show similar performance as compared to the switching curves of FIGS. 5A and 5B.

An advantage of BSPO modulator 10 of FIGS. 7A and 7B over the single grating embodiment of FIG. 1 is the greater number of optimization parameters (i.e., degrees of freedom) available for designing the modulator for a particular application. For example, there are now two grating thicknesses $T_G$ available due to the use of two P-M gratings 20. Also, the EO substrate thickness $T_{30}$ can be varied. In addition, the refractive indices $n_{110}$ of dielectric substrates 110 (which need not be electro-optic) can be varied and need not be the same. For example, as can be seen from FIG. 8B, a change in the EO substrate thicknesses $T_{30}$ by increments of 50 nm significantly changes the switching performance of BSPO modulator 10.

BSPO Modulator with 2D P-M Grating

Figure 9:
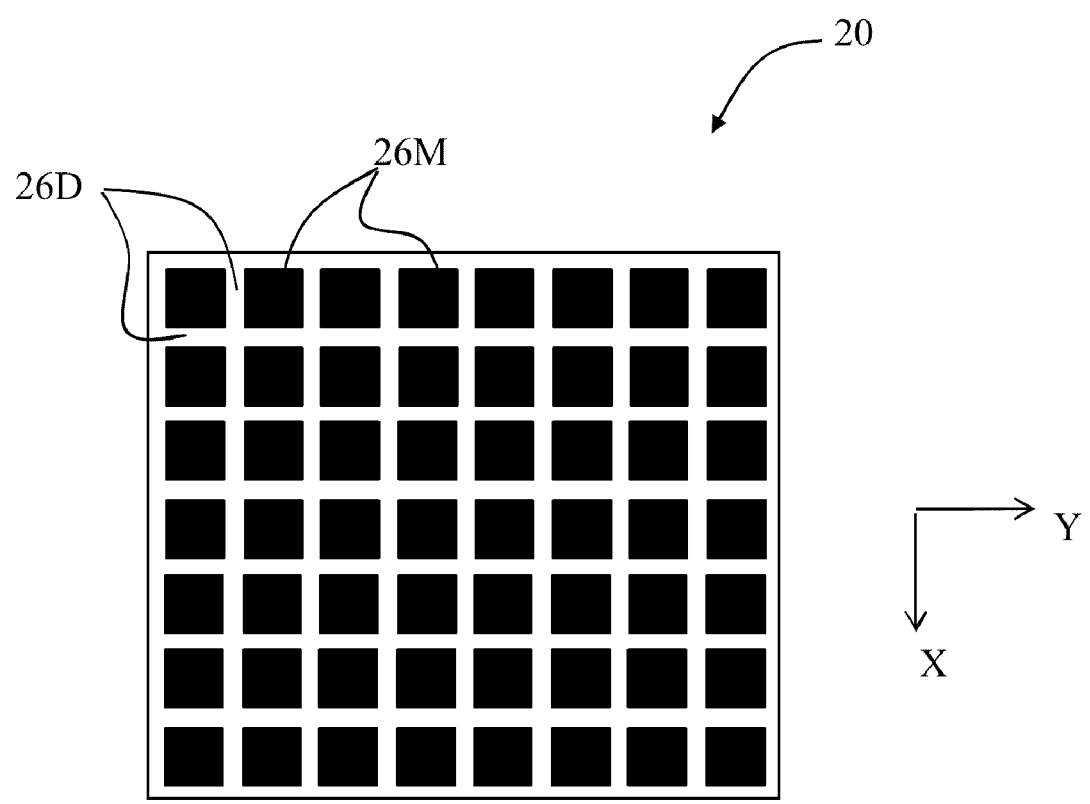
FIG. 9 is a top-down view of an example embodiment of a 2D P-M grating made up of metal sections and dielectric sections and that is used to form a polarization-insensitive BSPO modulator.

FIG. 9 is a top-down view of an example embodiment of 2D P-M grating 20 that has a tessellated arrangement of metal sections 26M separated by dielectric sections 26D. Generally, metal sections 26M and dielectric sections 26D have different sizes. This 2D example embodiment for P-M grating 20 is analogous to the 1D version of FIG. 2, but the grating now has a period $\Lambda_X$ in the X-direction and $\Lambda_Y$ in the Y-direction. The 2D P-M grating 20 of FIG. 9 can be used in any of the embodiments of BSPO modulator 10 discussed above. This geometry for P-M grating 20 makes BSPO modulator 10 substantially polarization-insensitive, which means that non-polarization maintaining waveguides 70 can be used.

Figure 10:
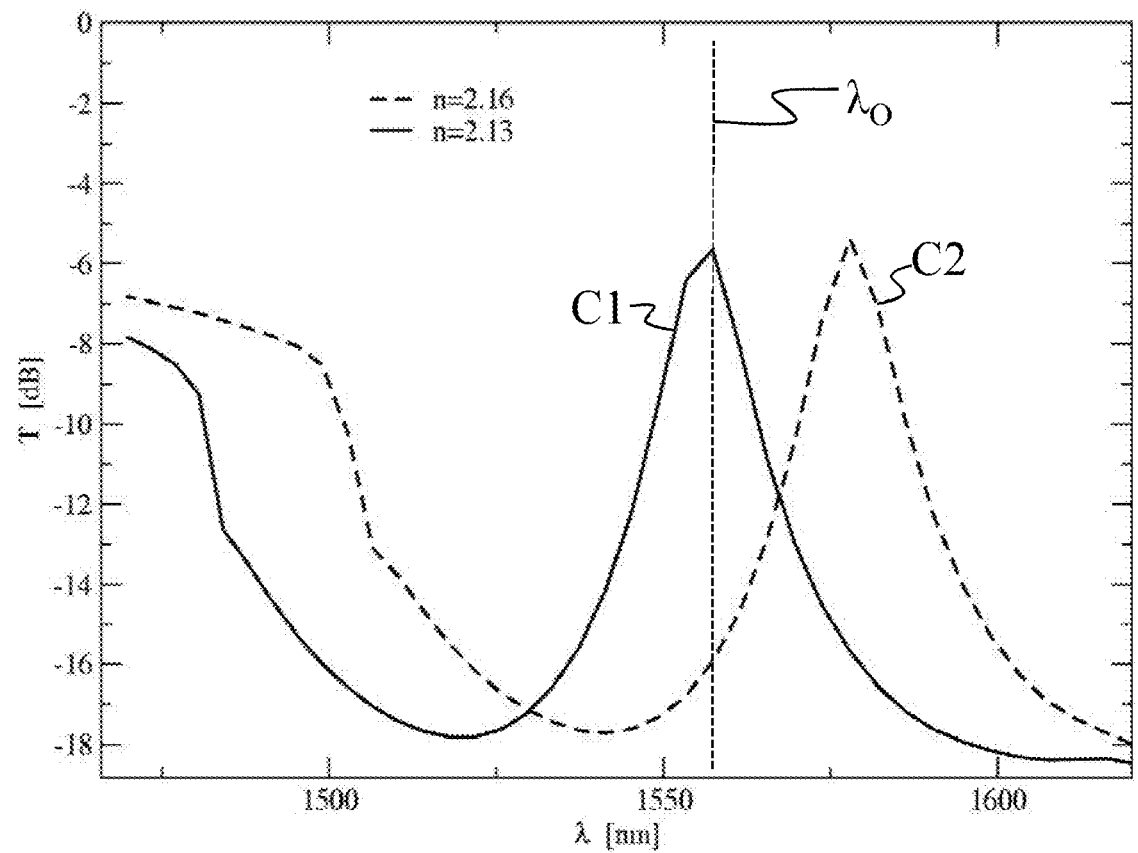
FIG. 10 shows switching curves C1 and C2 in a plot of transmission T (dB) versus wavelength (λ nm) similar to the plot of FIG. 5A, but for the BSPO modulator of FIG. 1 that includes the 2D grating of FIG. 9.

FIG. 10 shows switching curves C1 and C2 in a plot of transmission T (dB) versus wavelength (λ nm) similar to the plot of FIG. 5A, but using the 2D P-M grating 20 of FIG. 9 in the BSPO modulator 10 of FIG. 1. The 2D P-M grating 20 used in the simulations to form curves C1 and C2 had a period $\Lambda_X=\Lambda_Y=696$ nm and a duty cycle D=0.2 along both the X- and Y-axis. Metal sections 26M were modelled based on a gold film with a grating thickness $T_G=100$ nm. The polarization of the incident plane wave in input light 100I was along the Y-axis. The refractive index "n" in the plot refers to the dielectric refractive index of index-matching layers 40 and dielectric sections 26D, which were assumed equal in numerical simulations. About a 10 dB contrast is achieved at an operating wavelength $\lambda_O=1557$ nm for an index change of $\Delta n=0.03$.

Optical System with BSPO Modulator

Figure 11:
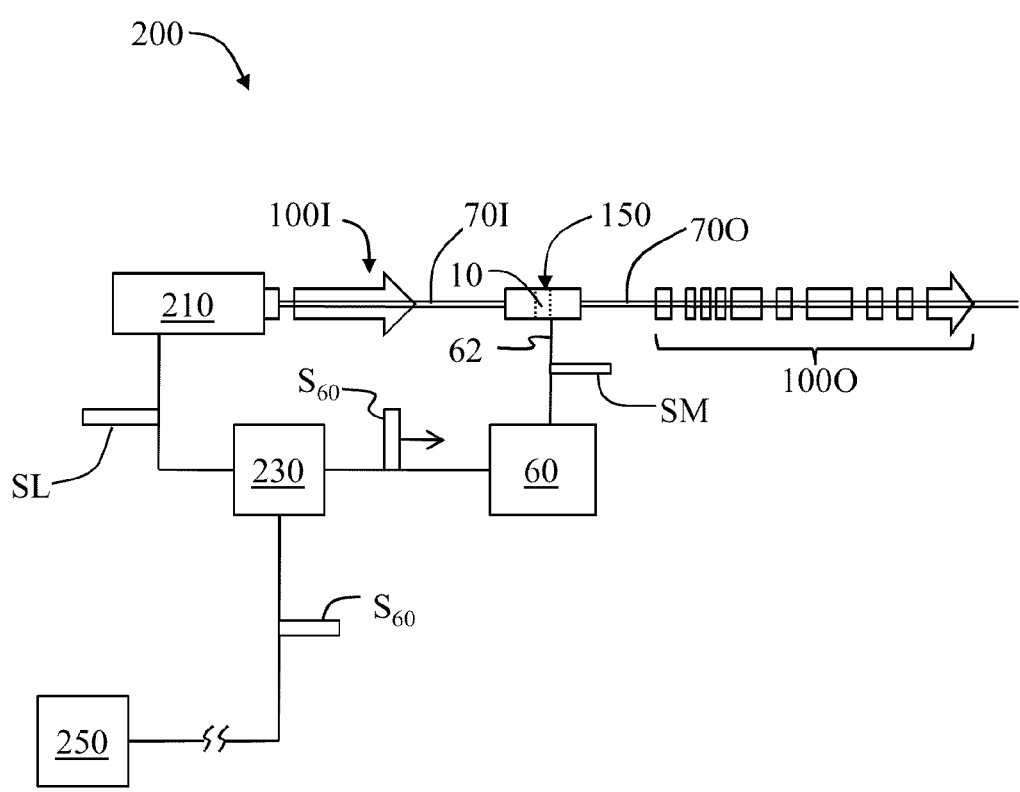
FIG. 11 is a schematic diagram of an example embodiment of an optical system that employs the BSPO modulator of the present invention to modulate light from a laser source.

FIG. 11 is a schematic diagram of an optical system 200 that employs BSPO modulator 10 of the present invention as an external modulator (as opposed to modulating the light source directly). Optical system 200 includes a laser source 210 that is optically coupled to a section of input waveguide 70I. Input and output waveguides 70I and 70O are optically coupled to input and output sides 12I and 12O (FIG. 3) of BSPO modulator 10 contained in housing 150. Modulator 10 is electrically connected to voltage source 60 via electrical line(s) 62. Voltage source 60 is in turn electrically connected to a controller/processor 230 that is also connected to laser source 210 and that is configured to control the operation of optical system 200. Optical system 200 may also include or be connected to a source 250 of voltage controller signals $S_{60}$ to be used to drive voltage source 60. Alternatively, voltage controller signals $S_{60}$ may be generated internally by controller/processor 230.

In operation, controller/processor 230 sends a laser control signal SL to laser source 210 to initiate the operation of laser source. In response, laser source 210 generates input light 100I, such as a continuous-wave carrier signal to be modulated.

Controller/processor 230 also creates or re-directs voltage controller signals $S_{60}$ to voltage source 60. Voltage controller signal $S_{60}$ contains modulation information to be used by voltage source 60 to form modulation voltage signal SM that includes, for example, a bias voltage and an RF applied voltage $V_{30}$ that includes the modulation information. Volgate source 60 provides modulation voltage signal SM (i.e., voltage $V_{30}$) to BSPO modulator 10, which in response thereto modulates input light 100 as described above to form modulated output light 100O (see also FIG. 1).

Advantages

The BSPO modulator 10 of the present invention can have a number of key advantages. A first advantage is that it can be made very compact so that the cross-sectional size of the modulator is about that of the core 73 of a typical waveguide such as an optical fiber. The BSPO modulator 10 can also be fabricated to have low coupling loss through the use of index-matching layers 40. In addition, BSPO modulator 10 provides for the direct modulation of light, as opposed to interferometric-based modulation that requires a phase modulation that is then converted to intensity modulation. Moreover, it modulates normally incident light rather than having to provide an oblique incident angle.

BSPO modulator 10 also has an operating wavelength $\lambda_O$ that can be tuned by the selection of the various modulator parameters discussed above. Designs can be extended to various wavelength windows such as 1550 nm, 1300 nm, and 850 nm.

The operating wavelength bandwidth $\Delta\lambda_O$ can be made to be on the order of 20 nm or so. Furthermore, a very high extinction ratio (about 20 dB or greater) can be achieved. A relatively high applied voltage $V_{30}$ may be required, however, unless an EO material with a relatively high EO coefficient is used, or if transparent electrodes 64 can be employed along optical axis A1. Both PM and non-PM embodiments of BSPO modulator 10 can be formed, depending on whether P-M grating 20 is 1D or 2D.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical modulator having a central axis and that employs a Bloch surface plasmon (BSP) effect at an operating wavelength to modulate input light transmitted along an optical axis when subject to an applied voltage, comprising:
   a permittivity-modulated (P-M) grating having a surface, and a central axis perpendicular to the surface and substantially aligned with the optical axis, the grating including a periodic arrangement of metal sections that define the grating surface and that define a modulated permittivity; and
   first and second electro-optic (EO) substrates having respective refractive indices that can vary in response to the applied voltage, and arranged along the optical axis so as to sandwich the P-M grating and form a configuration that supports the BSP when at least one of the EO substrates is subject to the applied voltage.

2. The optical modulator of claim 1, wherein the P-M grating comprises one of:
   a) first and second metal strips comprising first and second metals having different permittivities and oriented so that the periodic arrangement is one-dimensional; and
   b) first and second metal sections comprising first and second metals having different permittivities so that the periodic arrangement is two-dimensional.

3. The optical modulator of claim 1, further including a voltage source adapted to generate the applied voltage and that is electrically coupled to at least one of the first and second EO substrates via electrodes operably arranged on at least one of the EO substrates.

4. The optical modulator of claim 1, wherein the first and second EO substrates have surfaces substantially perpendicular to the optical axis, wherein the P-M grating is formed on one of the first and second EO substrate surfaces.

5. The optical modulator of claim 1, further including at least one waveguide optically coupled to at least one of the first and second EO substrates along the optical axis.

6. The optical modulator of claim 5, wherein the at least one waveguide comprises at least one optical fiber.

7. The optical modulator of claim 5, wherein the at least one waveguide has a core region with an associated size, and the modulator has a cross-sectional size about the same as the size of the waveguide core region.

8. The optical modulator of claim 5, wherein the first and second EO substrates have surfaces substantially perpendicular to the optical axis, the modulator further comprising:
   at least one index-matching layer arranged between the at least one waveguide and a corresponding at least one of the EO substrate surfaces.

9. An optical system for modulating the input light, comprising:
   the optical modulator of claim 1, the optical modulator having an input and an output side;
   a light source optically coupled to optical modulator at the modulator input side via an input optical waveguide;
   an output optical waveguide optically coupled to the optical modulator at the optical modulator output side; and
   a voltage source configured to provide the applied voltage to the optical modulator so as to modulate the input light and form modulated output light carried by the output waveguide.

* * * * *